US012629856B2

(12) United States Patent
Lee

(10) Patent No.: US 12,629,856 B2
(45) Date of Patent: May 19, 2026

(54) SOLAR PANEL DISASSEMBLING APPARATUS

(71) Applicant: Sang Hun Lee, Incheon (KR)

(72) Inventor: Sang Hun Lee, Incheon (KR)

( * ) Notice: Subject to any disclaimer, the term of this patent is extended or adjusted under 35 U.S.C. 154(b) by 138 days.

(21) Appl. No.: 18/720,676

(22) PCT Filed: Dec. 12, 2022

(86) PCT No.: PCT/KR2022/020153
§ 371 (c)(1),
(2) Date: Jun. 17, 2024

(87) PCT Pub. No.: WO2023/113407
PCT Pub. Date: Jun. 22, 2023

(65) Prior Publication Data
US 2025/0050393 A1 Feb. 13, 2025

(30) Foreign Application Priority Data

Dec. 17, 2021 (KR) ........................ 10-2021-0182040

(51) Int. Cl.
*B26D 3/28* (2006.01)
*B09B 3/35* (2022.01)
(Continued)

(52) U.S. Cl.
CPC .................. *B26D 3/28* (2013.01); *B09B 3/35* (2022.01); *B26D 1/547* (2013.01); *B26D 7/018* (2013.01); *B09B 2101/15* (2022.01)

(58) Field of Classification Search
CPC ... Y10T 83/202; Y10T 83/207; Y10T 83/364; Y10T 83/472; Y10T 83/4722;
(Continued)

(56) References Cited

U.S. PATENT DOCUMENTS

| | | | | |
|---|---|---|---|---|
| 8,376,291 B1 * | 2/2013 | Groves | .................... | B25H 1/04 |
| | | | | 182/180.1 |
| 2005/0150344 A1 * | 7/2005 | Nien | ........................ | B26D 5/08 |
| | | | | 83/651 |
| 2020/0198316 A1 * | 6/2020 | Coustier | ................ | B26D 3/281 |

FOREIGN PATENT DOCUMENTS

| | | | | |
|---|---|---|---|---|
| EP | 1324294 A2 * | 7/2003 | .............. | G09F 7/18 |
| JP | 2003-288028 A | 10/2003 | | |

(Continued)

OTHER PUBLICATIONS

Translation of JP2013-003299.*

*Primary Examiner* — Phong H Nguyen
(74) *Attorney, Agent, or Firm* — NKL Law; Jae Youn Kim

(57) ABSTRACT

There is provided a solar panel disassembling apparatus. The solar panel disassembling apparatus includes: a first fixing plate and a second fixing plate that hold both surfaces of the solar panel, respectively, in a state of having a distance from each other without coming into close contact with each other such that bond lines at a perimeter of the bonding surface are exposed: a moving unit that moves the first fixing plate and the second fixing plate in a parallel direction parallel to the bonding surface; and a wire-shaped cutting blade that is disposed in front of the solar panel in a movement direction of the solar panel to be parallel to the bonding surface and cuts the bonding surface, while passing through the bond line exposed toward the front between the first fixing plate and the second fixing plate.

12 Claims, 9 Drawing Sheets

(51) Int. Cl.
  *B26D 1/547* (2006.01)
  *B26D 7/01* (2006.01)
  *B09B 101/15* (2022.01)

(58) Field of Classification Search
  CPC ............. Y10T 83/4725; Y10T 83/5669; Y10T
    83/7487; B09B 3/00; B09B 3/35; B09B
    2101/15; B26D 1/547; B26D 1/5475;
    B26D 1/553; B26D 1/5535; B26D 3/28;
    B26D 7/018; B26D 7/01
  See application file for complete search history.

(56) References Cited

FOREIGN PATENT DOCUMENTS

| | | | |
|---|---|---|---|
| JP | 2013-003299 | A | 1/2013 |
| JP | 6512682 | B2 | 5/2019 |
| KR | 10-1064441 | B1 | 9/2011 |
| KR | 10-2014-0033675 | A | 3/2014 |
| KR | 10-2091346 | B1 | 3/2020 |

* cited by examiner (a) SIDE VIEW (b) FRONT VIEW (a) SIDE VIEW (b) a–a' CROSS–SECTIONAL VIEW (a) SIDE VIEW (b) FRONT VIEW (a)

(b)

SOLAR PANEL DISASSEMBLING APPARATUS

TECHNICAL FIELD

The present invention relates to a solar panel disassembling apparatus, and more specifically to a solar panel disassembling apparatus that effectively disassembles a double-sided or single-sided solar panel by using a wire-shaped cutting blade and a fixing structure which fixes both surfaces of the solar panel.

BACKGROUND ART

A solar panel is core equipment in the solar power generation. The solar panel has a structure in which a solar-cell integrated film layer is bonded to a glass plate. Recently, a double-sided solar panel in which glass plates are bonded to both surfaces of a film layer has also been manufactured.

As efficiency of the solar power generation has been significantly improved since the development thereof, many solar power generating plants are currently constructed. The solar power generating plants are applied to various regions such as a region to which an existing power generating plant is difficult to apply or an uncontaminated region sensitive to pollution.

The solar power generating plants have a maintenance problem of replacement or disposal of solar panels when a service life of solar cells is ended. Consequently, old solar panels are discarded; however, since simple discarding of the solar panels are not easy due to a structure in which the glass plate is bonded to the film layer, disposal of the solar panels is not easy.

In particular, there is a high demand for a method for processing a solar panel from which a glass plate is not crushed but disassembled in terms of resource utilization or energy saving; however, a problem arises in that a film layer bonded to a glass plate is not easy to cleanly remove by using a scraper or the like in the related art. In addition, the problem grows bigger since both glass plates on both surfaces should be disassembled in a case of a double-sided solar panel. No appropriate solution to the problem is provided, and thus there is a demand for a technical alternative.

CITATION LIST

Patent Literature

Patent Literature 1: Korean Patent Publication No. 10-2091346 (Mar. 19, 2020)

DISCLOSURE OF INVENTION

Technical Problem

In order to solve such problems, a technical object of the invention is to provide a solar panel disassembling apparatus that effectively disassembles a double-sided or single-sided solar panel by using a wire-shaped cutting blade and a fixing structure which fixes both surfaces of the solar panel.

Technical objects of the invention are not limited to the object mentioned above, and the following description enables those skilled in the art to clearly understand other unmentioned technical objects.

Solution to Problem

The solar panel disassembling apparatus according to the invention cuts a bonding surface between a glass plate and a film layer bonded to each other in a solar panel and separates the glass plate and the film layer from each other, and the solar panel disassembling apparatus includes: a first fixing plate and a second fixing plate that hold both surfaces of the solar panel, respectively, in a state of having a distance from each other without coming into close contact with each other such that bond lines at a perimeter of the bonding surface are exposed; a moving unit that moves the first fixing plate and the second fixing plate in a parallel direction parallel to the bonding surface; and a wire-shaped cutting blade that is disposed in front of the solar panel in a movement direction of the solar panel to be parallel to the bonding surface and cuts the bonding surface while passing through the bond line exposed toward the front between the first fixing plate and the second fixing plate.

The first fixing plate and the second fixing plate may stand and hold the solar panel such that the bond lines are exposed upward and downward.

The solar panel may be a double-sided panel including a pair of glass plates bonded to both surfaces of the film layer with the film layer being disposed between the glass plates, the pair of glass plates may be held by the first fixing plate and the second fixing plate, respectively, and the wire-shaped cutting blade may be configured of a pair of double blades which is disposed side by side to simultaneously separate the pair of glass plates from the film layer.

The solar panel disassembling apparatus may further include a gap adjusting unit that is provided between the moving unit and the first fixing plate and the second fixing plate and adjusts a gap between the first fixing plate and the second fixing plate.

When the wire-shaped cutting blade passes between the first fixing plate and the second fixing plate, the gap adjusting unit may increase a gap between the first fixing plate and the second fixing plate.

The solar panel disassembling apparatus may further include a glass plate storing rack that is positioned behind the wire-shaped cutting blade in the movement direction of the solar panel and is disposed to be overlappable with the first fixing plate and the second fixing plate.

The glass plate storing rack may pass through the gap between the first fixing plate and the second fixing plate, the gap having been increased by the gap adjusting unit.

Each of the first fixing plate and the second fixing plate may have an attaching surface that comes into surface contact with the solar panel and fixes the solar panel by generating an adjustable attachment force from a surface which comes into contact with the solar panel.

The attachment force may be generated by at least one of a negative-pressure generating unit and an adhering unit formed on the attaching surface.

The moving unit may include a guide rail which is disposed in the moving direction of the solar panel, and the gap adjusting unit may include a movable arm structure which connects the guide rail to the first fixing plate and the second fixing plate.

The bonding surface may be parallel to the direction of gravity, and a parallel movement direction of the solar panel may be perpendicular to the direction of gravity.

The bonding surface and a parallel movement direction of the solar panel may be both parallel to the direction of gravity.

The wire-shaped cutting blade may perpendicularly intersect a parallel movement direction of the solar panel.

The wire-shaped cutting blade may be disposed obliquely with respect to a parallel movement direction of the solar panel such that a contact area changes while the wire-shaped cutting blade comes into contact with the solar panel.

Advantageous Effects of Invention

According to the invention, since the solar panel is disassembled in a state where both surfaces of the solar panel are fixed, a very stable disassembling process can be performed. The wire-shaped cutting blade enables cut surfaces to be formed with higher accuracy and elaboration between fixing structures that hold both surfaces of the solar panel than a scraper, another blade, or the like in the related art, and thereby the glass plates and the film layer can be cleanly separated from each other. In addition, since a plurality of wire-shaped cutting blades are caused to simultaneously pass through the fixing structures to disassemble the glass plates of the double-sided panel at once and one surface of the solar panel does not have to be open so as to come into contact with a scraper, a blade, or the like as in the related art, the disassembling process can be performed while a placement direction, movement, or the like of the solar panel is variously changed in a state where both surfaces of the solar panel are stably held. In addition, the glass plates held by the fixing structures which fix both surfaces can be disassembled and can be transported as it is to a storage unit (glass plate storing rack or the like), and thus the whole processes of disassembling and discharging the solar panel can be simplified.

MODE FOR THE INVENTION

Advantages, features, and methods for achieving the advantages and the features of the invention are to be more clearly described with reference to embodiments which will be described below in detail together with the accompanying drawings. However, the invention is not limited to the embodiments to be disclosed hereinafter but can be realized in various different embodiments; simply, the embodiments are provided to complete the disclosure of the invention and completely inform those with ordinary skill in the art to which the invention pertains of the scope of the invention, and the invention is only defined by the claims. Through the entire specification, the same reference signs represent the same configurational elements, respectively.

Hereinafter, a solar panel disassembling apparatus according to the invention will be described in detail with reference to FIGS. 1 to 9. First, an embodiment of the invention will be described in detail with reference to FIGS. 1 to 7, and then the other embodiment will be described in detail based on the description of the embodiment described first.

Figure 1:
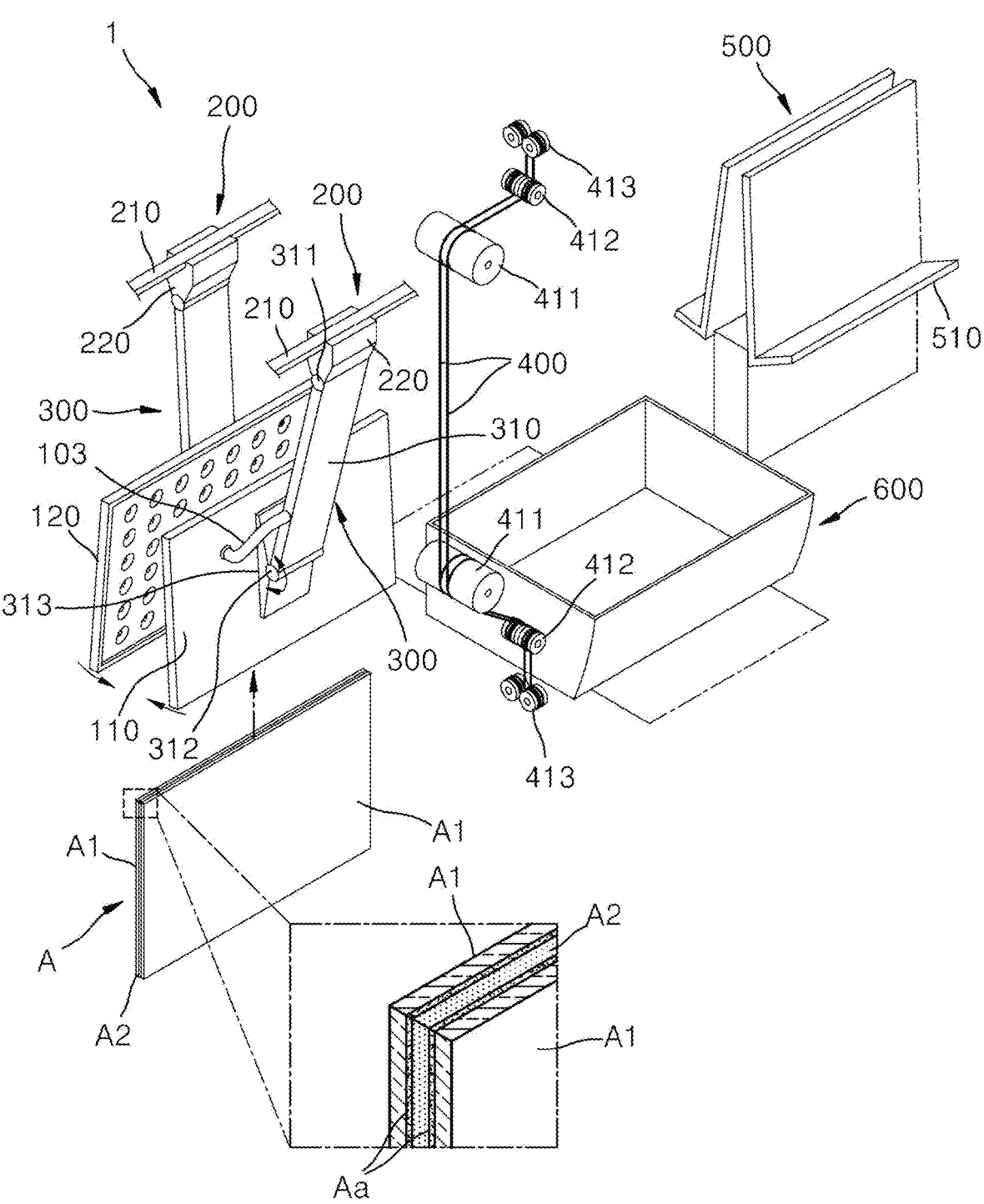
FIG. 1 is a perspective view illustrating a solar panel disassembling apparatus according to an embodiment of the invention.
Figure 2:
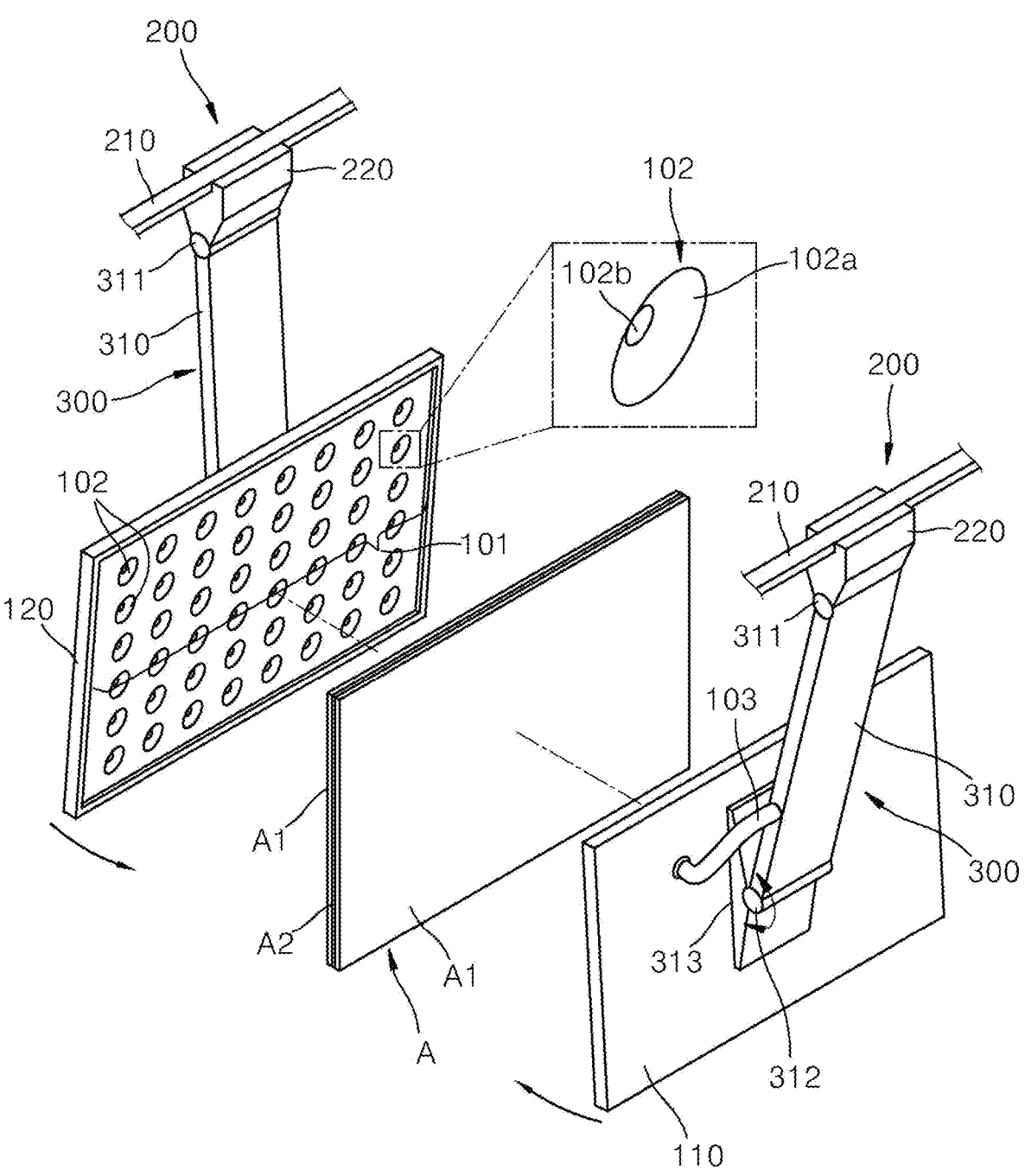
FIG. 2 is a view illustrating a structure and an operational mode of a first fixing plate and a second fixing plate of the solar panel disassembling apparatus illustrated in FIG. 1 in more detail.
Figure 3:
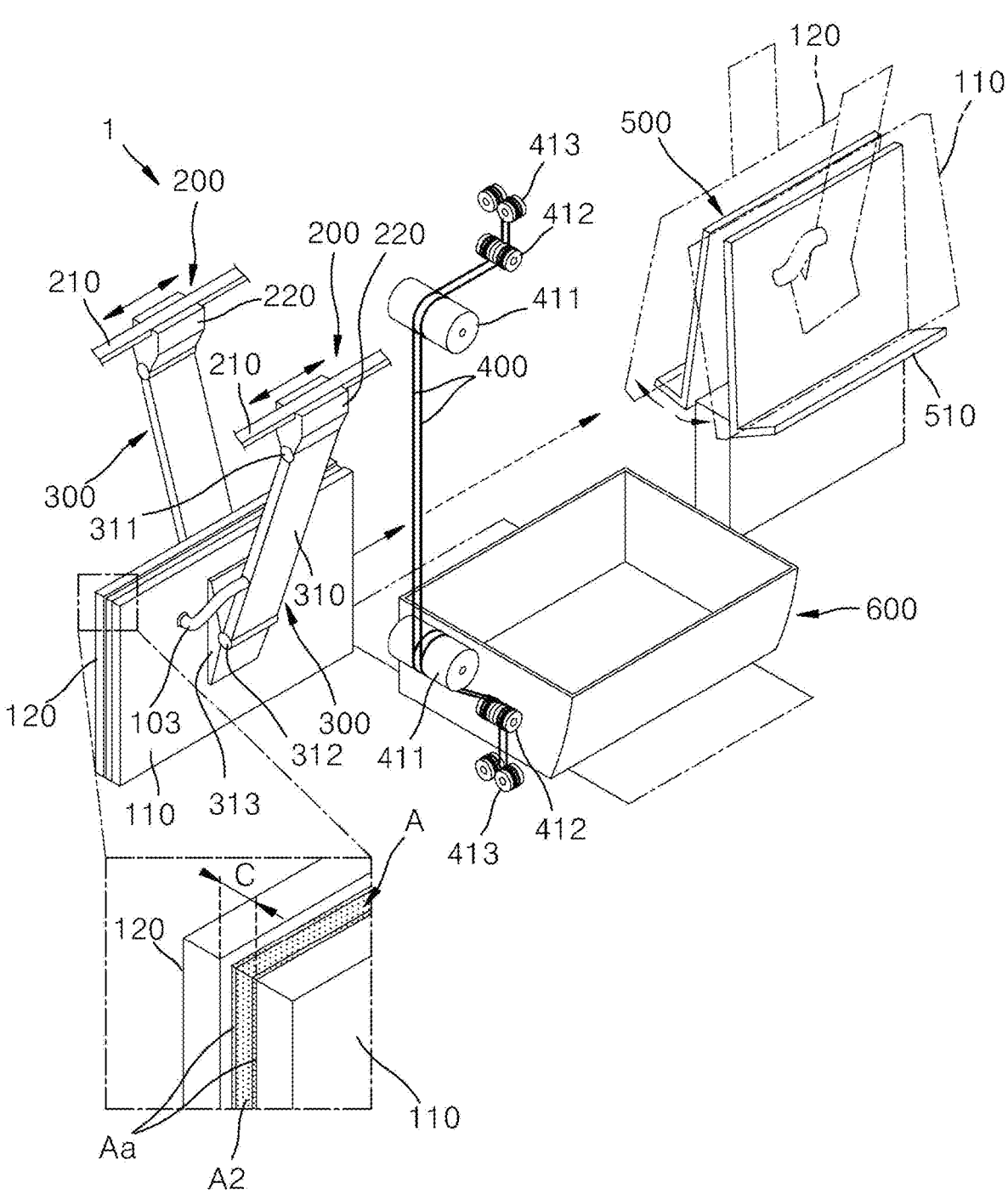
FIG. 3 is a perspective view schematically illustrating a disassembling operation of the solar panel disassembling apparatus illustrated in FIG. 1.

FIG. 1 is a perspective view illustrating a solar panel disassembling apparatus according to the embodiment of the invention. FIG. 2 is a view illustrating a structure and an operational mode of a first fixing plate and a second fixing plate of the solar panel disassembling apparatus illustrated in FIG. 1 in more detail. FIG. 3 is a perspective view schematically illustrating a disassembling operation of the solar panel disassembling apparatus illustrated in FIG. 1.

With reference to FIGS. 1 to 3, a solar panel disassembling apparatus 1 according to the invention causes a first fixing plate 110 and a second fixing plate 120 to hold both surfaces of a solar panel A, respectively, and fix the solar panel A. The first fixing plate 110 and the second fixing plate 120 come into close contact with both surfaces of the solar panel A but are formed not to come into contact with each other (refer to FIG. 3).

Hence, a certain gap C is formed between the first fixing plate 110 and the second fixing plate 120 even in a state where the two fixing plates are as close as possible, and bond lines Aa of the solar panel A having both surfaces held by the fixing plates can be exposed outside through the gap or a space between the fixing plates.

The exposed bond line Aa is accurately cut by a wire-shaped cutting blade 400. The wire-shaped cutting blade 400 has little volume, thus being very useful in penetrating the bond line Aa. In addition, there is no need to significantly change the gap between the two fixing plates during cutting. In the invention, as illustrated in FIG. 3, the wire-shaped cutting blade 400 is caused to pass, in parallel, between the two fixing plates which hold both surfaces of the solar panel A and can accurately cut a bonding surface (surface formed by bonding a glass plate and a film layer) positioned inside the bond lines Aa.

The solar panel disassembling apparatus 1 of the invention is configured as follows. The solar panel disassembling apparatus 1 cuts a bonding surface between a glass plate A1 and a film layer A2 bonded to each other in the solar panel A and separates the glass plate and the film layer from each other, and the solar panel disassembling apparatus 1 includes a first fixing plate 110 and a second fixing plate 120 that hold both surfaces of the solar panel A, respectively, in a state of having a distance from each other without coming into close contact with each other such that bond lines Aa at a perimeter of the bonding surface are exposed, a moving unit 200 that moves the first fixing plate 110 and the second fixing plate 120 in a parallel direction parallel to the bonding surface, and the wire-shaped cutting blade 400 that is disposed in front of the solar panel A in a movement direction of the solar panel to be parallel to the bonding surface and cuts the bonding surface while passing through the bond line Aa exposed toward the front between the first fixing plate 110 and the second fixing plate 120.

In the embodiments of the invention, the first fixing plate 110 and the second fixing plate 120 can stand and hold the solar panel A such that the bond lines Aa are exposed upward and downward. Hence, since the bonding surface of the solar panel A can be formed in a direction parallel to the direction of gravity (see G in FIG. 4) and a load is not applied in a perpendicular direction to the bonding surface when the solar panel A is stood in the direction of gravity, cut surfaces obtained after cutting of the bonding surface can be maintained in a separated state without coming into close contact with each other.

In addition, in the embodiments of the invention, the solar panel A can be a double-sided panel including a pair of glass plates A1 bonded to both surfaces of the film layer A2 with the film layer being disposed between the glass plates. The pair of glass plates A1 of the double-sided panel can be held by the first fixing plate 110 and the second fixing plate 120, respectively, and the wire-shaped cutting blade 400 can be configured of a pair of double blades which is disposed side by side to simultaneously separate the pair of glass plates A1 from the film layer. In the embodiment, the following description is provided based on the double-sided solar panel A and the wire-shaped cutting blade 400 configured of double blades; however, the solar panel and the cutting blade are not limited thereto, and the invention having an equivalent structure can be applied to any general single-sided panel including one glass plate A1 and one film layer A2.

Hereinafter, a configuration, an operation and effect, or the like of the invention are described in more detail with reference to the embodiment of the invention.

The solar panel A which is a disposal target of the invention includes the glass plate A1 and the film layer A2 that are bonded to each other. Solar cells are integrated in the film layer A2, and the solar-cell integrated film layer A2 having a relatively thin film shape can be stacked on the glass plate A1. The glass plate A1 and the film layer A2 are bonded to each other, and thus the bond lines Aa are formed between the glass plate A1 and the film layer A2 as illustrated in FIG. 1.

The bond lines Aa are located at the perimeter of an inner bonding surface. Since the bonding surface between the glass plate A1 and the film layer A2 is formed along the glass plate A1 having both surfaces which are parallel to each other, the bonding surface is set as a surface that is formed inside the bond lines Aa to be parallel to an outer surface of the glass plate A1.

The 'bonding surface' is a surface observed in a state where bonding of the solar panel A is completed, and a surface formed by disassembling the solar panel A and then cutting the bonding surface with the wire-shaped cutting blade 400 is referred to as a 'cut surface'.

The first fixing plate 110 and the second fixing plate 120 can be formed into a plate-shaped structure broader than the solar panel A. The first fixing plate 110 and the second fixing plate 120 hold both surfaces of the solar panel A, respectively, in a state of having a distance from each other without coming into close contact with each other such that the bond lines Aa at the perimeter of the bonding surface of the solar panel A are exposed. The first fixing plate 110 and the second fixing plate 120 can have substantially the same structure and can be formed into respective symmetrical shapes to be symmetrically disposed at both sides of the solar panel A.

The structure of the fixing plates is described in detail with reference to FIG. 2, as follows. Each of the first fixing plate 110 and the second fixing plate 120 can have a surface structure at an inner side thereof, the surface structure coming into close contact with an outer surface of the solar panel A. Each of the first fixing plate 110 and the second fixing plate 120 can have an attaching surface 101 that comes into surface contact with the solar panel A and fixes the solar panel by generating an adjustable attachment force from a surface which comes into contact with the solar panel A. The attaching surface 101 of each fixing plate substantially has a flat surface structure to come into surface-to-surface contact with the outer surface (particularly, glass plate) of the solar panel A, thereby very stably fixing the solar panel A in a state of being in close contact with the solar panel A.

The attachment force of each fixing plate (hereinafter, indicating one of the first fixing plate and the second fixing plate) can be generated by at least one of a negative-pressure generating unit 102 and an adhesion unit (not illustrated) formed on the attaching surface 101. The negative-pressure generating unit 102 is illustrated in FIG. 2; however, in the other embodiment, the adhesion unit (for example, including an adhesive plate and a pressurizing unit that applies pressure to the adhesive plate to detach the solar panel) which is attached to the solar panel A by the adhesiveness can be disposed. Both the negative-pressure generating unit 102 and the adhesion unit can be applied.

For example, the negative-pressure generating unit 102 can have multiple suction holes 102a arranged on the attaching surface 101. In such a structure, an internal flow path 102b is positioned at the inner side of the suction holes 102a such that the suction holes 102a can be interconnected to each other, and all of the suction holes can be formed to communicate with a suction tube 103 at an outer side of each fixing plate. A total suction force of all of the suction holes 102a can be determined by suction pressure of a fluid which is suctioned through the suction tube 103. For example, the suction tube 103 can extend through a connection structure such as a gap adjusting unit 300 to the outside and can be connected to a pump (not illustrated) which suctions a fluid, the gap adjusting unit 300 extending toward the outer side of each fixing plate.

A shape, the number, or the like of the suction holes 102a can be adjusted as necessary and does not have to be limited to that illustrated in FIG. 2.

Such a structure enables the first fixing plate 110 and the second fixing plate 120 to fix the solar panel A by an attachment force generated from the attaching surface 101. For example, the solar panel A can come into close contact with the attaching surface 101 to fix the solar panel while the attachment force is increased or decreased by adjusting a level of sound pressure; conversely, the solar panel A can be detached from the attaching surface 101 by removing or decreasing the attachment force. As illustrated in FIG. 2, the first fixing plate 110 and the second fixing plate 120 allow the attachment force to act on both surfaces of the solar panel A and simultaneously hold both surfaces of the solar panel A.

With reference to FIG. 3, in a state of being held by the first fixing plate 110 and the second fixing plate 120, both surfaces (glass plates of both surfaces in a case of the double-sided panel) of the solar panel A can be housed inside the first fixing plate 110 and the second fixing plate 120. The above-described attaching surface (see 101 in FIG. 2) can be formed by a sunken structure toward the inner side of each fixing plate, and thus the glass plates A1 of the solar panel A can be fixed to the inside of the respective fixing plates. In this manner, both surfaces of the solar panel A are fixed to the respective fixing plates.

On the other hand, the bond lines Aa of the solar panel A are exposed outside through the gap C between the first fixing plate 110 and the second fixing plate 120 as illustrated in FIG. 3. In the case of the double-sided solar panel A as in the embodiment, the glass plates (see A1 in FIG. 2) of both surfaces can be inserted into the respective fixing plates, and only the film layer A2 between the glass plates and the bond lines Aa can be exposed between the two fixing plates. Consequently, the bond lines Aa and the bonding surface inside the bond lines can be cut by the wire-shaped cutting blade 400 without difficulty.

The moving unit 200 moves the first fixing plate 110 and the second fixing plate 120 in the parallel direction parallel to the bonding surface of the solar panel A. For example, the moving unit 200 can include a guide rail 210 laid out in a movement direction of the solar panel A. FIGS. 1 to 3 illustrate only a part of the guide rail 210; however, the guide rail 210 can extend farther along a forward side of the movement direction of the solar panel A as a whole (refer to FIG. 4).

When the solar panel A is stood to expose the bond lines Aa upward and downward as illustrated in FIG. 2, the bonding surfaces are also arranged toward upper and lower sides. The bonding surfaces are virtually parallel to the outer surfaces of the glass plate A1, and thus an arrangement direction of the bonding surfaces inside the bond lines can be determined from an arrangement direction of the outer surfaces of the glass plate A1. In the embodiment, the bonding surfaces can be stood to be parallel to the direction of gravity (see G in FIG. 4), and the solar panel A is moved in a direction (direction parallel to the ground) parallel to the bonding surface and perpendicular to the direction of gravity. Consequently, the guide rail 210 can be laid out in the direction perpendicular to the direction of gravity (direction parallel to the ground).

For example, the moving unit 200 can include the guide rail 210 and a slider 220 connected to the guide rail 210. A drive unit that provides a linear driving force to at least one of the guide rail 210 and the slider 220 can be provided to enable the slider 220 to move along the guide rail 210. However, the moving unit 200 does not have to be limited to a structure in which the guide rail 210 is used, and the moving unit 200 can be configured to use various shapes of linear driving units or the like which can move the fixing plates on a straight line.

The moving unit 200 can be formed solely; however, as in the embodiment, a pair of moving units can be disposed at the first fixing plate 110 and the second fixing plate 120, respectively. The shape and disposition of the moving unit 200 can be suitably changed with consideration for a structure of a space in which the solar panel disassembling apparatus 1 is installed, a moving path of the fixing plates, case of coupling to other configurations, or the like.

The gap adjusting unit 300 that adjusts a gap between the first fixing plate 110 and the second fixing plate 120 is formed between the moving unit 200 and the first fixing plate 110 and the second fixing plate 120. The gap adjusting unit 300 does not have be limited thereto and can be formed as a movable arm structure 310 which connects the guide rail 210 of the moving unit 200 to the first fixing plate 110 and the second fixing plate 120. However, the gap adjusting unit 300 can be also modified into any other structures which can adjust a gap between the two fixing plates.

The gap adjusting unit 300 can be configured suitably by using various joint structures (systems that adjust a gap by using a joint), telescopic structures (systems that adjust a gap by changing a length thereof), and the like in addition to the movable arm structure 310 described in the embodiment. Incidentally, in the embodiment, an example in which the gap adjusting unit is realized in a shape of arm having a joint is described.

For example, the movable arm structure 310 can be connected to the guide rail 210 via the slider 220. One end of the movable arm structure 310 can be movably coupled to the sliders 220 of the moving unit 200 through first joint portions 311 and the other end thereof can be movably coupled to outer surfaces of both the first fixing plate 110 and the second fixing plate 120 through second joint portions 312. An angle adjusting plate 313 which is attached to a broad portion of each fixing plate to easily change an angle by joint driving and supports a load can be disposed between the second joint portion 312 and each fixing plate.

The movable arm structure 310 can change an angle of each of the first fixing plate 110 and the second fixing plate 120 by using at least two joint portions or can change a distance between the first fixing plate 110 and the second fixing plate 120. For example, the movable arm structure can rotate the fixing plates by driving the second joint portions 312 and can change a gap between the two fixing plates in a state where the fixing plates are parallel to each other or are inclined by driving the first joint portions 311 and the second joint portions 312. For example, a drive unit such as a servomotor which can perform accurate control can be applied to the joint portions.

As illustrated in FIG. 3, the wire-shaped cutting blade 400 is disposed to be parallel to the bonding surface of the solar panel A in front of the movement direction (refer to a dotted arrow) of the solar panel A. When the fixing plates hold the solar panel A and move in a parallel direction to the bonding surface, the wire-shaped cutting blade 400 passes between the first fixing plate 110 and the second fixing plate 120 through the bond line Aa exposed forward in the movement direction of the bond lines Aa at the perimeter of the bonding surface and cuts the bonding surface of the solar panel A.

As illustrated in FIG. 3, the wire-shaped cutting blade 400 can perpendicularly intersect a parallel movement direction of the solar panel A. In such a disposition, the wire-shaped cutting blade 400 can be disposed to be parallel to the direction of gravity. However, the disposition of the wire-shaped cutting blade 400 does not have to be limited thereto, and the wire-shaped cutting blade 400 can be used by being disposed obliquely at a constant angle with respect to the movement direction of the solar panel A.

The wire-shaped cutting blade 400 can include a structure for producing tension. For example, one or a plurality of drive rollers 411, 412, and 413 can be disposed at both ends of the wire-shaped cutting blade 400 to pull the cutting blade by tension. The cutting blade can be driven in a tension direction by rotating the rollers while the tension is maintained. Hence, the wire-shaped cutting blade 400 can cut the solar panel A while traveling in a length direction. The wire-shaped cutting blade 400 can be a wire saw which is driven in the tension direction.

An example illustrated in FIG. 3 has a structure in which the wire-shaped cutting blade 400 can be wound around or unwound from the plurality of drive rollers 411, 412, and 413; however, both ends of the wire-shaped cutting blade 400 do not have to have a distance from each other. Even in the illustrated example, the wire-shaped cutting blade 400 can have a configuration in which both ends of the wire-shaped cutting blade are connected to each other into a track shape to perform repeated rotation. Desirably, the wire-shaped cutting blade 400 can be modified to have a configuration in which both ends thereof are connected to each other like a caterpillar track.

The wire-shaped cutting blade 400 can be formed by a heating wire which performs melting through the bond lines Aa between the glass plate A1 and the film layer A2 with heat to perform cutting. A structure in which the wire-shaped cutting blade is driven to have tension applied by rollers or the like can also be applied to the heating wire-shaped cutting blade 400. However, the heating wire does not have to be driven, and a fixed structure can be applied thereto as long as the heating wire can perform cutting even when being fixed in a state where tension is applied to the heating wire.

The wire-shaped cutting blade 400 can be formed by at least one of the wire saw which is driven in the tension direction, and the heating wire which performs melting between the glass plate A1 and the film layer A2 with heat to perform the cutting. Double blades can also be formed by combining the heating wire and the wire saw.

The wire-shaped cutting blade 400 has a very thin thickness (can have a diameter of 100 μm or smaller) and thus can function as a very sharp blade when being pulled by tension. In particular, when both surfaces of the solar panel A are fixed by the two fixing plates and thus a narrow gap is formed between the two fixing plates as in the invention, the wire-shaped cutting blade 400 has a very advantageous structure for performing the cutting through the bond lines Aa. The fine wire-shaped cutting blade 400 can be configured of the double blades which are disposed side by side as in the embodiment, and the double blades can perform cutting through a pair of exposed bond lines Aa simultaneously such that the pair of glass plates (refer to Reference sign A1 in FIGS. 1 and 2) positioned at an outer side of the bond lines Aa can be separated.

A glass plate storing rack that 500 which is disposed to overlap the first fixing plate 110 and the second fixing plate 120 as illustrated in FIGS. 1 and 3 can be positioned behind the wire-shaped cutting blade 400 in the movement direction of the solar panel A. The glass plate storing rack 500 is disposed on a moving line on which the solar panel A is moved, and the separated glass plate A1 can be loaded immediately on the glass plate storing rack. The glass plate storing rack 500 can have a structure such as a blocking step 510 which supports the separated glass plate A1.

The glass plate storing rack 500 can pass between the first fixing plate 110 and the second fixing plate 120, the gap having been increased by the gap adjusting unit 300 (refer to FIG. 3). The two glass plates A1 which are positioned in the middle of the first fixing plate 110 and the second fixing plate 120 on movement lines of the fixing plates, respectively, and are held by the two fixing plates can be simultaneously loaded on the glass plate storing rack 500. A pair of glass plate storing racks 500 can be formed to be symmetrical to each other such that loading surfaces thereof can be disposed to overlap the two different fixing plates, respectively.

A basket 600 which collects the film layer A2 detached from the glass plates A1 can be disposed between the glass plate storing rack 500 and the wire-shaped cutting blade 400. In particular, in a case of disassembling the double-sided solar panel A, the two glass plates A1 are attached to the first fixing plate 110 and the second fixing plate 120, respectively, and thus the film layer A2 can fall downward by self-load and can be collected in the basket 600 when the two glass plates A1 are simultaneously separated by the double blades. The racks and the basket are disposed on the movement line along which the first fixing plate 110 and the second fixing plate 120 move the solar panel A in parallel by holding both surfaces of the solar panel.

Hereinafter, with reference to FIGS. 4 to 6, an operation of the solar panel disassembling apparatus will be described in more detail.

Figure 4:
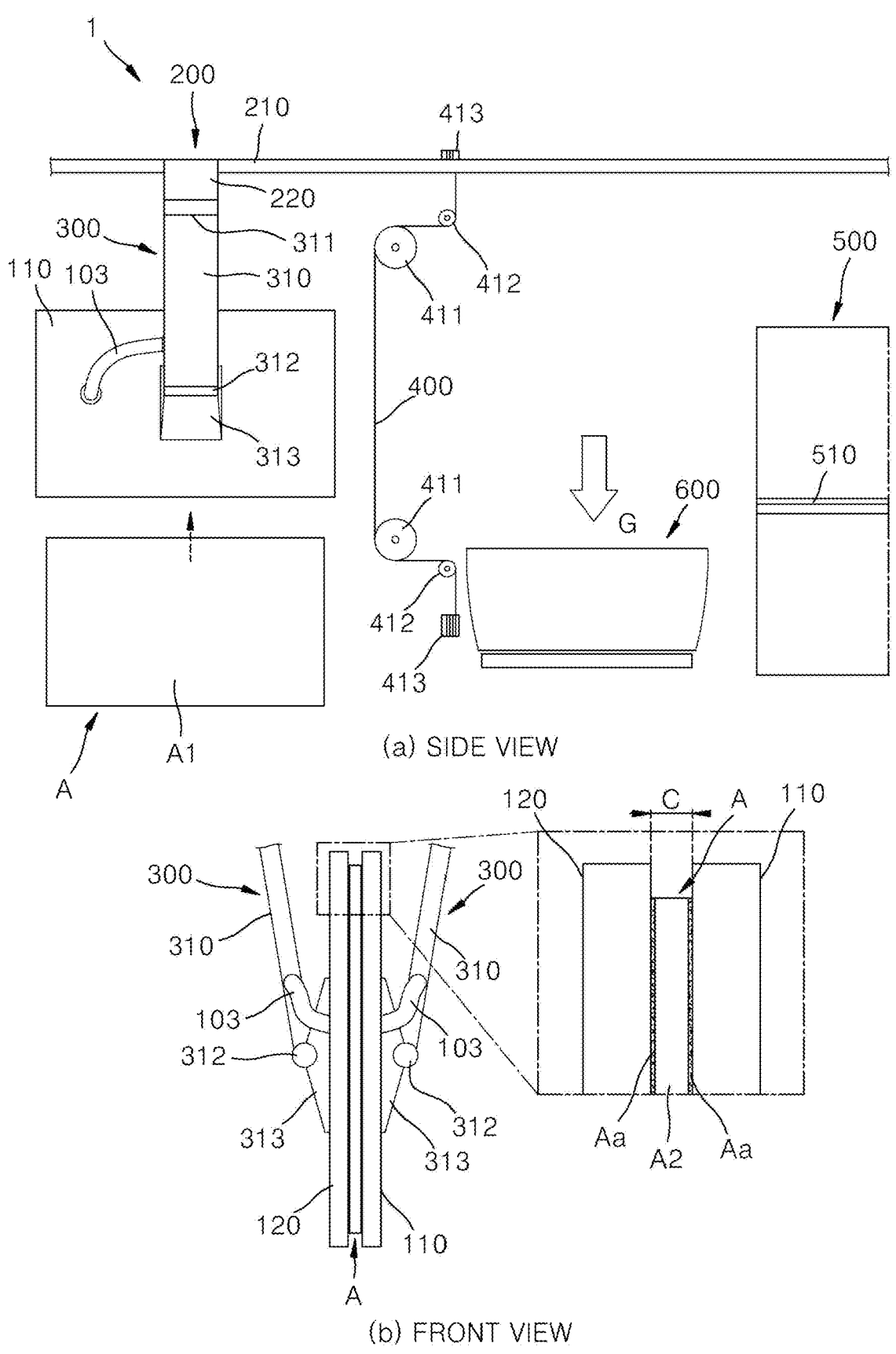
FIGS. 4 to 6 are operation views sequentially illustrating a disassembling sequence of the solar panel disassembling apparatus illustrated in FIG. 1.
Figure 5:
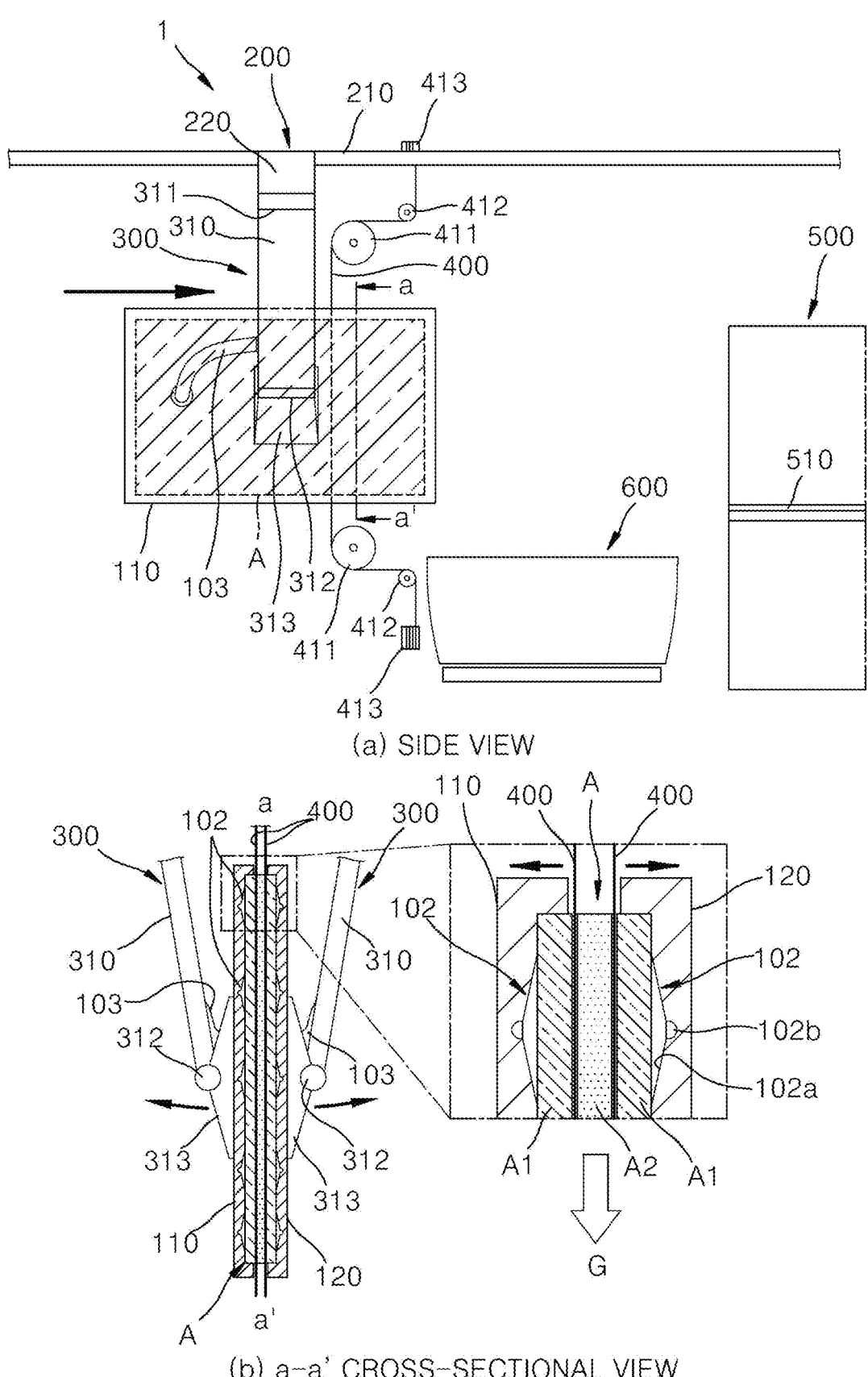
Figure 6:
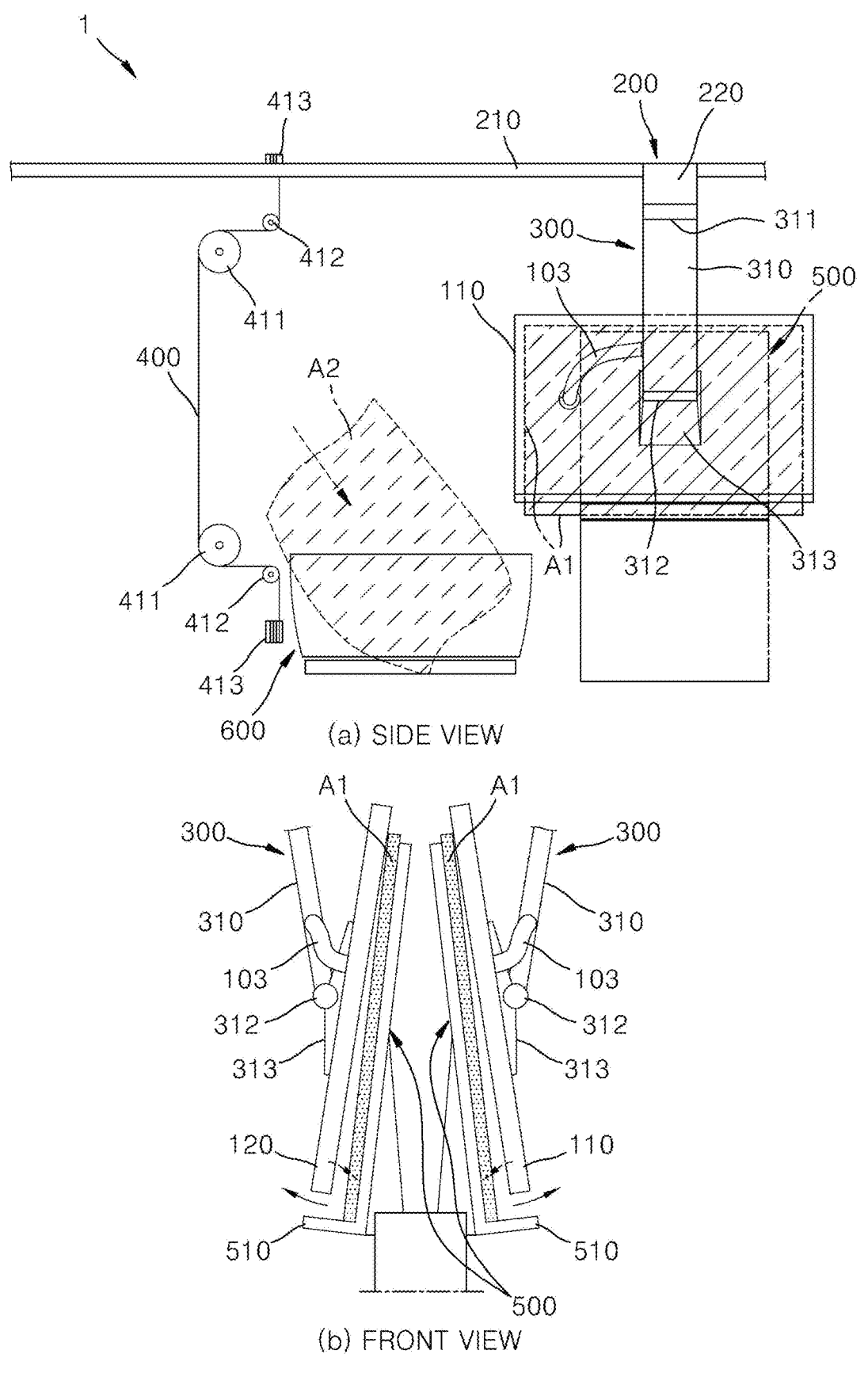

FIGS. 4 to 6 are operation views sequentially illustrating a disassembling sequence of the solar panel disassembling apparatus illustrated in FIG. 1. In order to clearly illustrate a disassembling operation, a side view and a front view or a cross-sectional view of the fixing plates are together illustrated in the drawings.

First, as illustrated in FIG. 4, the solar panel A is inserted between the first fixing plate 110 and the second fixing plate 120 and is fixed between the first fixing plate 110 and the second fixing plate 120. The solar panel A is accommodated between the two fixing plates by operating the above-described gap adjusting unit 300 to change the gap between the first fixing plate 110 and the second fixing plate 120 (refer to FIG. 1), and the attachment force is generated from the attaching surface (see 101 in FIG. 2) to fix the two fixing plates in a state where both the fixing plates are in close contact with both surfaces of the solar panel A, respectively.

After the fixing, the two glass plates A1 of the double-sided solar panel A can be inserted into the first fixing plate 110 and the second fixing plate 120 and cannot be substantially viewed as illustrated in (b) of FIG. 4. On the other hand, the two bond lines Aa and the film layer A2 therebetween are exposed outside through the gap C between the first fixing plate 110 and the second fixing plate 120.

With reference to FIG. 5, the solar panel A fixed to the first fixing plate 110 and the second fixing plate 120 can be disassembled while being moved in parallel to the bonding surface and in the direction perpendicular to the direction of gravity G. The two fixing plates connected to the moving unit 200 pass in a direction intersecting the wire-shaped cutting blade 400 while moving along the guide rail 210. The wire-shaped cutting blade 400 passes between the two fixing plates through the bond lines Aa exposed between the fixing plates in an opposite direction of the fixing plates, and cuts the bonding surface between the glass plate A1 and the film layer A2 as illustrated in FIG. 5.

In this case, the gap adjusting unit 300 can increase the gap between the two fixing plates by adjusting the gap. That is, when the wire-shaped cutting blade 400 passes between the first fixing plate 110 and the second fixing plate 120, the gap adjusting unit 300 can widen a space between the two fixing plates to increase the gap between the first fixing plate 110 and the second fixing plate 120. For example, the joint portions of the movable arm structure 310 can be driven, thereby applying pressure in a direction in which the two fixing plates are moved apart from each other. In this manner, pressure can be applied to both surfaces of the solar panel A attached to the fixing plates, respectively, in a direction in which both surfaces are moved apart from each other.

Since the two glass plates A1 of both surfaces of the solar panel A maintain a state of being in close contact with the respective fixing plates due to attachment forces of the first fixing plate 110 and the second fixing plate 120, respectively, the pressure applied by the gap adjusting unit 300 can act on the cut surfaces cut from the bonding surface between the glass plate A1 and the film layer A2. Consequently, after the cut surfaces are formed, the cut surfaces can more easily keep a distance without adhering to each other. In addition, as described above, since the bonding surfaces are arranged in the direction of gravity G, a load is applied to the surfaces in a direction parallel to the surfaces such that the cut surfaces formed by cutting the bonding surface can be more easily maintained in a state of having a distance from each other.

With reference to (b) of FIG. 5, a gap increase between the first fixing plate 110 and the second fixing plate 120 which is found during the cutting may not be relatively large. A sufficient gap increase means an extent in which the cut surfaces do not adhere to each other, and the gap can be suitably adjusted within such a limit. Since the cut surfaces and the bonding surface which is not cut can coexist and only a part of the glass plate A1 is bonded in the middle of a cutting operation, excessive gap generation can damage the glass plate A1. Consequently, it is preferable that a degree of a gap change be maintained to the appropriate extent that the glass plates A1 are not damaged, or the gap is changed in accordance with a process.

When the bonding surface is cut, the first fixing plate 110 and the second fixing plate 120 are moved to the glass plate storing rack 500 in a state of holding the separated glass plates A1 as illustrated in FIG. 6. As described above, the film layer A2 bonded to both the glass plates A1 can be separated from the glass plate A1 by a cutting operation and can fall downward by self-load and can be collected in the basket 600.

The first fixing plate 110 and the second fixing plate 120 can be caused to more increase the gap between the two fixing plates and can remove the attachment force at the glass plate storing rack 500. Consequently, in a state where the two fixing plates overlap the glass plate storing rack 500, the separated glass plates A1 can be immediately loaded into the glass plate storing rack 500. Consequently, a loading process of the glass plates A1 is performed immediately after the disassembling process, the processes can be performed more concisely and efficiently.

Although not illustrated, the glass plate storing rack 500 can be configured to include an automatic discharge device such as a conveyor such that the loaded glass plates A1 can be automatically transported to a discharge location. In this manner, the stable disassembling process of the solar panel A can be performed very conveniently and efficiently. When the disassembling sequence is ended, the two fixing plates can return to original locations thereof and can repeat the disassembling operation.

As illustrated above, the solar panel A may not be the double-sided panel but a single-sided panel including one glass plate A1 and one film layer A2. Also in this case, the two fixing plates can hold both surfaces of the solar panel A and can perform the disassembling operation substantially in the same manner. Incidentally, in this case, one of the two fixing plates can hold the glass plate A1, the other fixing plate can hold the film layer A2, and the fixing plate holding the film layer A2 can first discharge the film layer A2 by adjusting the attachment force after the cutting. When the wire-shaped cutting blade 400 having double blades is replaced only with a single blade, the single-sided panel can be also conveniently disassembled through a process which is substantially equivalent to the above-described process.

Figure 7:
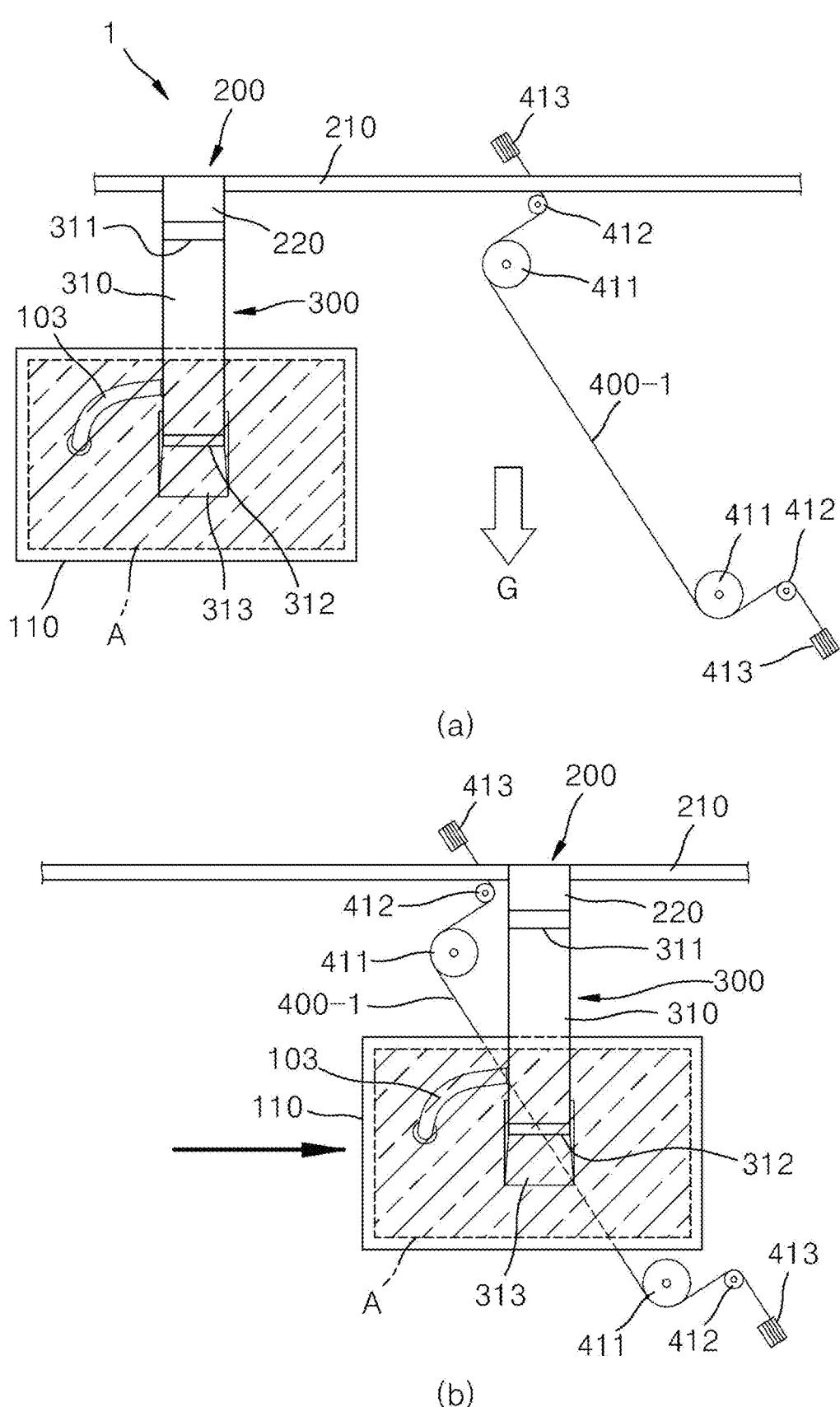
FIG. 7 is a side view illustrating a modification example of a wire-shaped cutting blade of the solar panel disassembling apparatus illustrated in FIG. 1.

Meanwhile, with reference to FIG. 7, a wire-shaped cutting blade 400-1 can be modified to be disposed obliquely so as to have a constant inclined angle with respect to the movement direction of the solar panel A. The wire-shaped cutting blade 400-1 can be disposed obliquely with respect to the parallel movement direction of the solar panel A such that a contact area can be changed, particularly while the wire-shaped cutting blade comes into contact with the solar panel A. Even when the inclined angle changes, the wire-shaped cutting blade 400-1 is positioned on a plane parallel to the bonding surface to which the glass plate and the film layer are bonded, and thus the wire-shaped cutting blade can perform the cutting between the glass plate and the film layer without difficulty.

For example, when the solar panel A is moved, the obliquely disposed wire-shaped cutting blade 400-1 can gradually increase a contact area by starting to come into contact with a vertex at one side at which two edges of the solar panel A meet each other. Conversely, when the wire-shaped cutting blade leaves the solar panel A, the wire-shaped cutting blade can leave the solar panel to an opposite side as the contact area is gradually decreased. Consequently, while the wire-shaped cutting blade 400-1 is in contact with the solar panel, an effect of decreasing the contact area is achieved such that frictional heat generated in the wire-shaped cutting blade can be decreased. In addition, such a configuration described above can be advantageous in that the wire-shaped cutting blade 400-1 is cooled or fatigue or damage accumulated in the wire-shaped cutting blade 400-1 is reduced due to the decrease in contact area per hour. In addition, the cutting blade comes into contact with the solar panel A in a method of obliquely cutting the solar panel, and thus a cutting effect can be increased.

As described above, the solar panel A between the fixing plates can also be disassembled by modifying the wire-shaped cutting blade 400-1.

Hereinafter, a solar panel disassembling apparatus according to the other embodiment of the invention will be described in detail with reference to FIGS. 8 and 9. The following description focuses on configurations different from those of the above-described embodiment for conciseness and clearness of the description, and the descriptions of parts which are not otherwise described are all substituted by the descriptions provided above.

Figure 8:
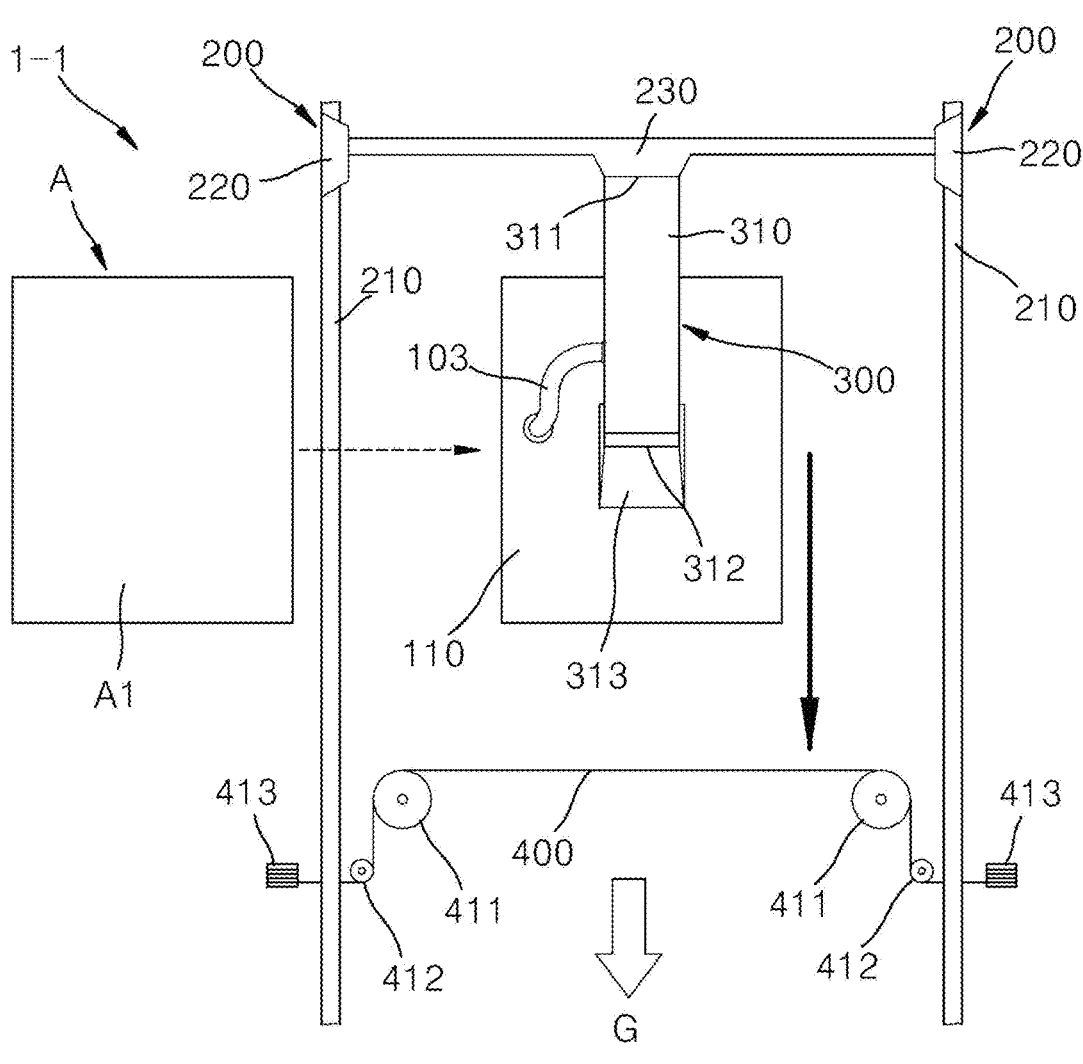
FIG. 8 is a side view illustrating a solar panel disassembling apparatus according to the other embodiment of the invention.
Figure 8:
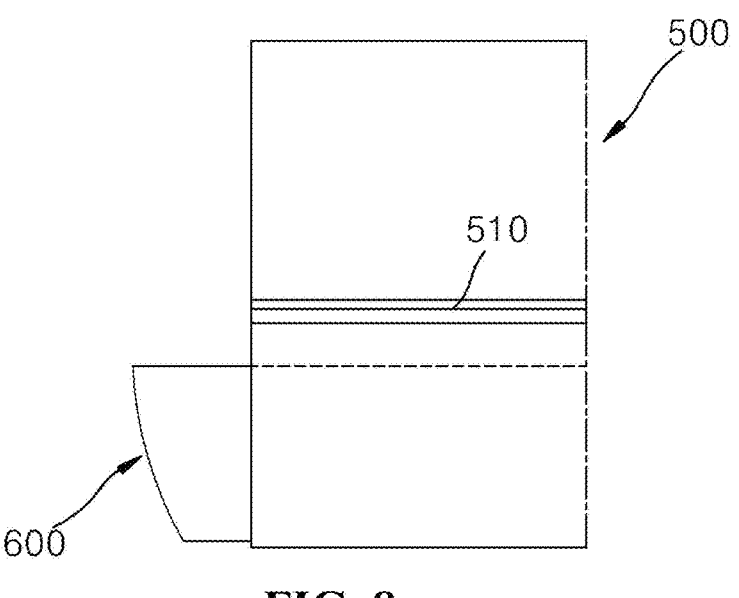
Figure 9:
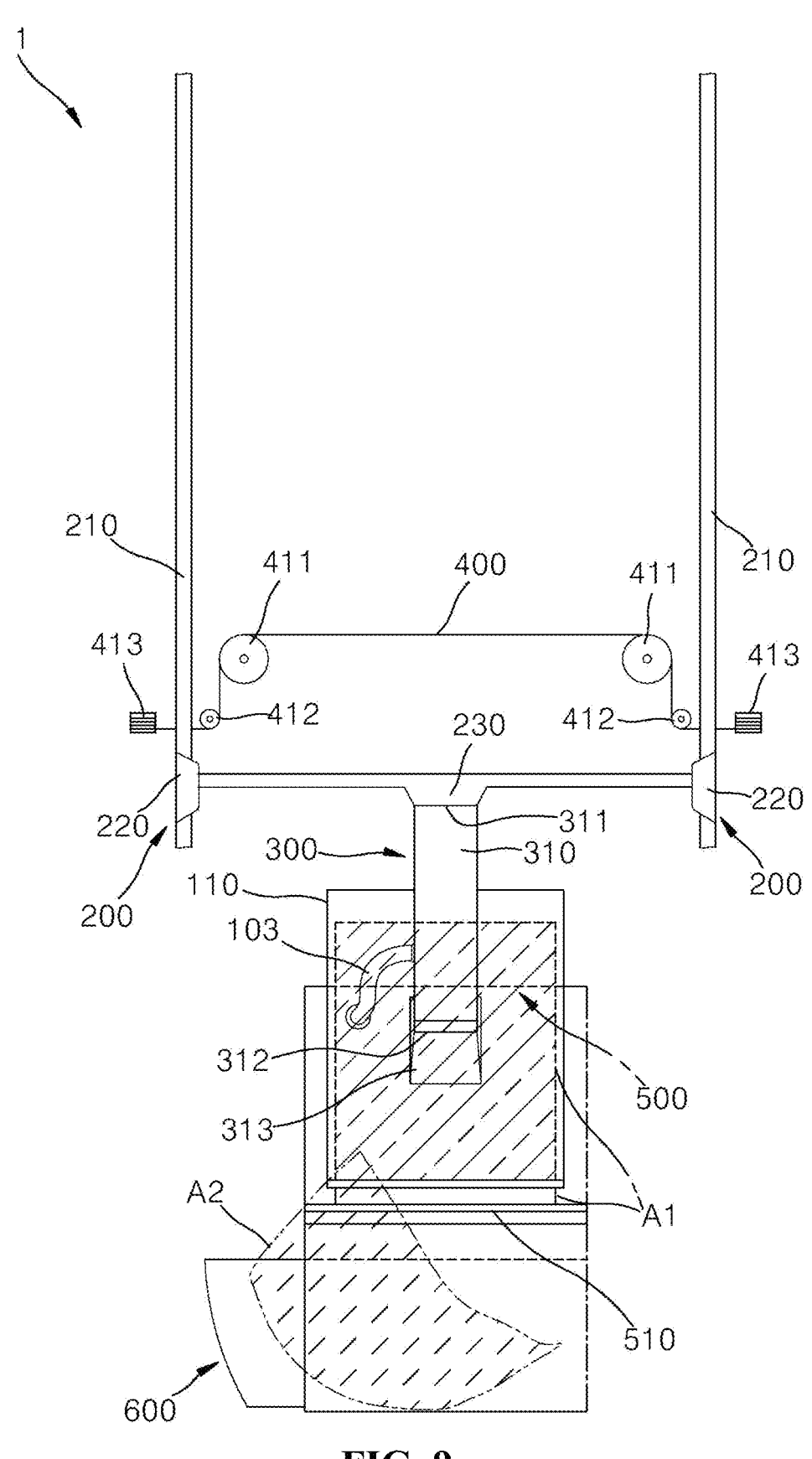
FIG. 9 is a side view illustrating an end state of a disassembling sequence of the solar panel disassembling apparatus illustrated in FIG. 8.

FIG. 8 is a side view illustrating the solar panel disassembling apparatus according to the other embodiment of the invention. FIG. 9 is a side view illustrating an end state of a disassembling sequence of the solar panel disassembling apparatus illustrated in FIG. 8.

With reference to FIG. 8, in a solar panel disassembling apparatus 1-1 according to the other embodiment of the invention, both the bonding surface of the solar panel A and the parallel movement direction of the solar panel A are set to be parallel to the direction of gravity G. The embodiment can have substantially the same configuration as described above except that a parallel movement direction of the first fixing plate 110 and the second fixing plate 120 is changed to a vertical direction. The different parts are described in more detail as follows.

In the other embodiment of the invention, the moving unit 200 can include a guide rail 210 laid out in the vertical direction. A plurality of guide rails 210 can be disposed in the vertical direction by being divided into two groups at both sides. In this case, the moving unit 200 can include a connection arm 230 which slidably moves by connecting the guide rails 210, and the movable arm structure 310 can be connected between the connection arm 230 and the fixing plates.

As illustrated in FIG. 8, the wire-shaped cutting blade 400 can be disposed below the original locations of the fixing plates and can be disposed to perpendicularly intersect the movement direction of the solar panel A. Hence, the wire-shaped cutting blade can be disposed in a direction perpendicular to the direction of gravity G (direction parallel to the ground) and can perform the cutting between the glass plate and the film layer while intersecting the solar panel A which is moved in parallel to the direction of gravity G as illustrated in FIG. 8.

The glass plate storing rack 500 can be disposed at a lower location than the wire-shaped cutting blade 400 in the direction of gravity G. Consequently, as illustrated in FIG.

9, the two fixing plates can be moved past the separate wire-shaped cutting blade 400, can separate the glass plates A1, and then can immediately load the glass plate A1 on the glass plate storing rack 500 by moving downward in a state of holding the separated glass plate A1.

A pair of glass plate storing racks 500 can be provided, and the basket 600 can be disposed between the glass plate storing racks 500. Consequently, the film layer A2 which is separated from the glass plates A1 and falls downward can be collected in the basket 600 between the two glass plates A1 which are loaded on the racks at both sides. In this manner, the solar panels in which the glass plates A1 and the film layer A2 are bonded to each other can be effectively disassembled using the wire-shaped cutting blades 400 and the fixing structure that fixes both surfaces of the solar panel A. As described above, the embodiments of the invention are described with reference to the accompanying drawings; however, a person of ordinary skill in the art to which the invention pertains can understand that the invention can be realized as another example without changing the technical idea or an essential feature of the invention. Therefore, the embodiments described above have to be understood, in every aspect, as exemplified embodiments and not as embodiments to which the invention is limited.

INDUSTRIAL APPLICABILITY

According to the invention, the solar panel can be disassembled in a state where both surfaces of the solar panel are fixed, and a very stable disassembling process can be performed. and the wire-shaped cutting blade enables cut surfaces to be formed with higher accuracy and elaboration between fixing structures that hold both surfaces of the solar panel than a scraper, another blade, or the like in the related art, and thereby the glass plates and the film layer can be cleanly separated from each other. and since a plurality of wire-shaped cutting blades are caused to simultaneously pass through the fixing structures to disassemble the glass plates of the double-sided panel at once and one surface of the solar panel does not have to be open so as to come into contact with a scraper, a blade, or the like as in the related art, the disassembling process can be performed while a placement direction, movement, or the like of the solar panel is variously changed in a state where both surfaces of the solar panel are stably held. and the glass plates held by the fixing structures which fix both surfaces can be disassembled and can be transported as it is to a storage unit, and thus the whole processes of disassembling and discharging the solar panel can be simplified. so the invention has industrial applicability.

The invention claimed is:

1. A solar panel disassembling apparatus that cuts a bonding surface between a glass plate and a film layer bonded to each other in a solar panel and separates the glass plate and the film layer from each other, the solar panel disassembling apparatus comprising:

a first fixing plate and a second fixing plate that hold both surfaces of the solar panel, respectively, in a state of being spaced apart from each other such that bond lines at a perimeter of the bonding surface are exposed;

a moving unit that moves the first fixing plate and the second fixing plate in a parallel direction parallel to the bonding surface;

a wire-shaped cutting blade that is disposed in front of the solar panel in a movement direction of the solar panel to be parallel to the bonding surface and cuts the bonding surface while passing through the bond lines exposed toward the front between the first fixing plate and the second fixing plate; and a gap adjusting unit including a movable arm structure that connects a guide rail to the first fixing plate and the second fixing plate, wherein each of the first fixing plate and the second fixing plate has an attaching surface that comes into contact with the solar panel and fixes the solar panel by generating an adjustable attachment force at the attaching surface, and wherein the moving unit includes the guide rail disposed in the movement direction of the solar panel.

2. The solar panel disassembling apparatus according to claim 1, wherein the first fixing plate and the second fixing plate stand and hold the solar panel such that the bond lines are exposed upward and downward.

3. The solar panel disassembling apparatus according to claim 2, wherein the bonding surface is parallel to the direction of gravity, and the movement direction of the solar panel is perpendicular to the direction of gravity.

4. The solar panel disassembling apparatus according to claim 2, wherein the bonding surface and the movement direction of the solar panel are both parallel to the direction of gravity.

5. The solar panel disassembling apparatus according to claim 1, wherein the solar panel is a double-sided panel including a pair of glass plates bonded to both surfaces of the film layer with the film layer being disposed between the glass plates, wherein the pair of glass plates are held by the first fixing plate and the second fixing plate, respectively, and wherein the wire-shaped cutting blade incudes a pair of double blades which are disposed side by side to simultaneously separate the pair of glass plates from the film layer.

6. The solar panel disassembling apparatus according to claim 1, wherein the gap adjusting unit is disposed between the moving unit and the first fixing plate and the second fixing plate and adjusts a gap between the first fixing plate and the second fixing plate.

7. The solar panel disassembling apparatus according to claim 6, wherein, when the wire-shaped cutting blade passes between the first fixing plate and the second fixing plate, the gap adjusting unit increases the gap between the first fixing plate and the second fixing plate.

8. The solar panel disassembling apparatus according to claim 1, further comprising: a glass plate storing rack that is positioned behind the wire-shaped cutting blade in the movement direction of the solar panel and is disposed to be overlappable with the first fixing plate and the second fixing plate.

9. The solar panel disassembling apparatus according to claim 8, wherein the glass plate storing rack passes through the gap between the first fixing plate and the second fixing plate, the gap having been increased by the gap adjusting unit.

10. The solar panel disassembling apparatus according to claim 1, wherein the adjustable attachment force is generated by at least one of a negative-pressure generating unit and an adhering unit formed on the attaching surface.

11. The solar panel disassembling apparatus according to claim 1, wherein the wire-shaped cutting blade perpendicularly intersects the movement direction of the solar panel.

12. The solar panel disassembling apparatus according to claim 1, wherein the wire-shaped cutting blade is disposed obliquely with respect to the movement direction of the solar panel such that a contact area changes while the wire-shaped cutting blade comes into contact with the solar panel.

* * * * *